(12) United States Patent
Haswarey et al.

(10) Patent No.: US 12,324,054 B1
(45) Date of Patent: Jun. 3, 2025

(54) PERSISTING PRIVATE MOBILE WIRELESS NETWORK PREFERENCE FOR MOBILE WIRELESS NETWORK DEVICES ON PRIVATE NETWORKS

(71) Applicant: United States Cellular Corporation, Chicago, IL (US)

(72) Inventors: Bashir A. Haswarey, Elmhurst, IL (US); Mohammad Abu-Samra, Orland Park, IL (US); Narothum Saxena, Hoffman Estates, IL (US); Michael S. Irizarry, Barrington Hills, IL (US); Claudio Taglienti, Barrington Hills, IL (US)

(73) Assignee: United States Cellular Corporation, Chicago, IL (US)

( * ) Notice: Subject to any disclaimer, the term of this patent is extended or adjusted under 35 U.S.C. 154(b) by 0 days.

(21) Appl. No.: 18/642,157

(22) Filed: Apr. 22, 2024

(51) Int. Cl.
*H04W 8/00* (2009.01)
*H04W 8/18* (2009.01)
*H04W 84/04* (2009.01)

(52) U.S. Cl.
CPC ........... *H04W 8/005* (2013.01); *H04W 8/183* (2013.01); *H04W 84/042* (2013.01)

(58) Field of Classification Search
CPC .... H04W 8/005; H04W 8/183; H04W 84/042
See application file for complete search history.

(56) References Cited

U.S. PATENT DOCUMENTS

| 2012/0269163 | A1* | 10/2012 | Edara .................... H04W 24/00 370/329 |
| 2020/0322317 | A1* | 10/2020 | Ranganathan .......... H04L 9/321 |
| 2021/0021572 | A1* | 1/2021 | Bonczar .................. H04L 63/20 |
| 2024/0171484 | A1* | 5/2024 | Muñoz De La Torre Alonso ....... H04L 43/062 |

* cited by examiner

Primary Examiner — Joseph E Avellino
Assistant Examiner — Maryam Emadi
(74) Attorney, Agent, or Firm — Leydig, Voit & Mayer, Ltd.

(57) ABSTRACT

A method, carried out by a private mobile wireless terminal, is described. The private mobile wireless terminal comprises a subscriber identification module applet, for persisting a connectivity preference for a home mobile wireless network that is a private mobile wireless network. The private mobile wireless terminal operates in a mobile wireless environment comprising a primarily mobile network provider including a sponsored roaming application server (SRAS). After losing the connection to the private mobile wireless network and connecting to an alternative mobile network, further operations are carried out to restore a persisted connectivity preference for connecting to the private mobile wireless network after service is restored following a service outage of the private mobile wireless network.

18 Claims, 3 Drawing Sheets

PERSISTING PRIVATE MOBILE WIRELESS NETWORK PREFERENCE FOR MOBILE WIRELESS NETWORK DEVICES ON PRIVATE NETWORKS

FIELD OF THE INVENTION

The present disclosure generally relates to mobile wireless communications. More particularly, the present disclosure is directed to providing preferred mobile wireless network access between mobile wireless devices and private mobile wireless networks.

BACKGROUND OF THE INVENTION

A variety of private entities maintain their own private mobile wireless networks, including both mobile wireless network core and radio access network components. In such cases, a private entity configures and maintains a self-reliant/complete mobile wireless network including both radio access node (RAN) equipment as well as core network components.

In such cases, the private entities desire their associated private mobile wireless devices (including Internet-of-Things devices) to maintain a persistent preference to connect to the private entities' private mobile wireless networks, and to seek connection to a public mobile wireless network in instances where the preferred/private mobile wireless network cannot be reached. In case a private mobile wireless device switches to the public mobile wireless network due to a failure of the private mobile wireless network, it is desirable for the private mobile wireless network to re-connect to the private mobile wireless network when availability of the private mobile wireless network is restored.

When the private mobile wireless device connects to a public mobile wireless network, a public land mobile network (PLMN) identifier, corresponding to the public mobile wireless network, is registered and stored as a "last-registered PLMN" (RPLMN) in a subscriber identification module (SIM) of the private mobile wireless device. Additionally, an Equivalent PLMN (EPLMN) list is provided (and stored on the private mobile wireless device SIM) that contains PLMN identifiers for PLMNs considered as equivalents (potential substitutes) of the wireless network corresponding to the currently stored RPLMN.

In known LTE protocols, if a PLMN identifier of a currently available mobile wireless network is provided in the RPLMN field, then the private mobile wireless device will attempt registration using the RPLMN identifier, which may not be the highest priority PLMN in the Equivalent Home PLMN (EHPLMN) or the Home PLMN (HPLMN).

Only in the case where the private mobile wireless device enters the idle mode state, will the device attempt to use the highest priority PLMN (associated with the desired private mobile wireless network) found in the EHPLMN/HPLMN list defined in the SIM (operational) profile. If the private mobile wireless device does not enter idle mode (i.e., devices is continuously sending/receiving data preventing entering the idle mode state), the device will not attempt to use the highest priority PLMN in the EHPLMN/HPLMN. Thus, without manual intervention, the private mobile wireless device will continue to connect to the PLMN-using the RPLMN—to which the private mobile wireless device connected during an outage of the private mobile wireless network.

SUMMARY OF THE INVENTION

A method, carried out by a private mobile wireless terminal, is described. The private mobile wireless terminal comprises a subscriber identification module applet, for persisting a connectivity preference for a home mobile wireless network that is a private mobile wireless network. The private mobile wireless terminal operates in a mobile wireless environment comprising a primarily mobile network provider including a sponsored roaming application server (SRAS). The method comprises performing a network scan to identify candidate mobile wireless networks within operating range of the private mobile network device and then connecting to the private mobile wireless network that is indicated as the recent/preferred mobile network for mobile wireless connections. The method further includes reporting the established connection, to the private mobile wireless network, to the SRAS and then losing the established connection as a result of the private mobile wireless network being in an out of service state.

The method further includes performing a supplemental wireless network scan to identify candidate mobile wireless networks within operating range of the private mobile network device and then establishing a new connection to an alternative secondary mobile wireless network that is indicated as an acceptable replacement for the private mobile wireless network; and receiving a trigger message issued by the SRAS that invokes the SIM applet to perform a series of operations to restore a persisted connectivity preference for connecting to the private mobile wireless network after service is restored following a service outage of the private mobile wireless network.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE DRAWINGS

Figure 1:
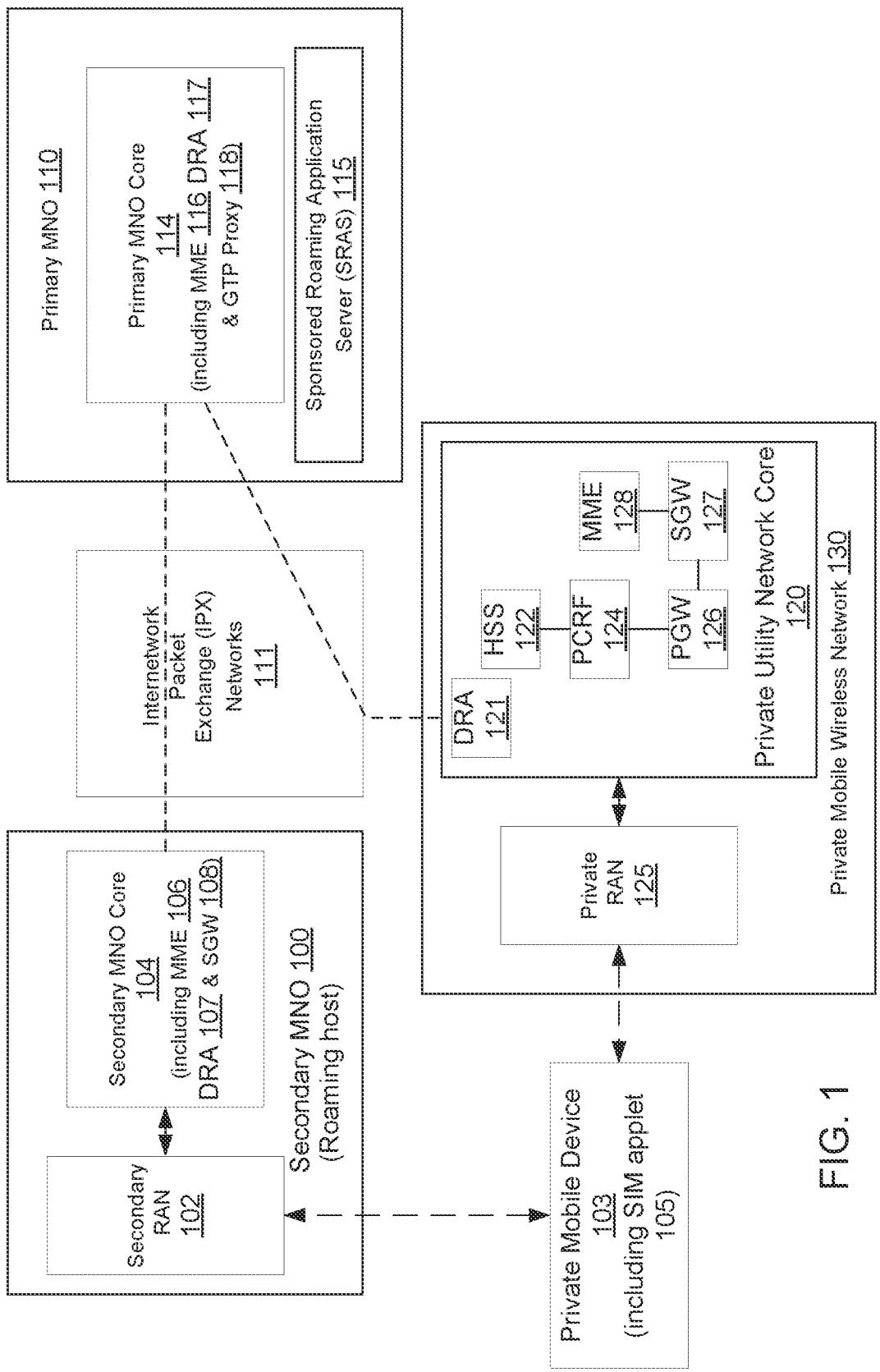
FIG. 1 is a schematic diagram of an exemplary mobile wireless network radio network environment including a primary MNO, a secondary MNO (public mobile wireless network) having a RAN through which UE devices of the primary MNO establish an air connection, and a private mobile wireless network including a private RAN and core network in accordance with the disclosure.

A system, in accordance with the present disclosure, includes a primary MNO hosting (for administrative purposes) private UE devices associated with a private mobile wireless network. Such support may be carried out via a secondary MNO providing roaming access for the private UE devices on behalf of the primary MNO. The system includes a sponsored roaming application server (SRAS) of the primary MNO that is configured to monitor both an operational status of the private mobile wireless network and a recent successful connection of the private mobile wireless device to the primary or secondary MNO network. Additionally, the private mobile wireless device includes a subscriber identification module (SIM) that is configured with a SIM applet for persisting as preference to connect to the private mobile wireless network. The SIM applet, when triggered (after a service outage and service restoration on the private mobile wireless network), is to execute steps to re-establish connectivity to the (preferred) private mobile wireless network. The SIM (operational) profile is configured with the EHPLMN/HPLMN list containing a ranked (by priority/preference) listing of PLMN identifiers having the PLMN identifier corresponding to the private mobile wireless network as the highest priority entry.

In the above-summarized operating environment, preference of the private mobile wireless device for the private mobile wireless network is persisted through successful MNO connection monitoring and restorative instruction by the SRAS, with regard to the private mobile wireless device, in cases of a failed connection attempt between the private mobile wireless device and the private mobile wireless network. The SRAS detects the private mobile wireless device successfully attaching to a mobile wireless network that is not the (preference-persisted) private mobile wireless network. Thereafter, in response to an indication that the (preference-persisted) private mobile wireless network has been restored to an in-service state, the SRAS issues a reset triggering message invoking the SIM applet to cause the private mobile wireless device to execute operations restoring the private mobile wireless network as the RPLMN based on the identification of the PLMN for the private mobile wireless network being the highest priority PLMN in the EHPLMN/HPLMN list to which the private mobile wireless device first seeks to establish a connection. Thus, a preference by the private mobile wireless device for connecting to the private mobile wireless network (over any overlapping MNO wireless network) is automatically restored on the private mobile wireless device in accordance with restoration of wireless service provided by the private mobile wireless network to the private mobile wireless device.

By way of example, the SRAS listens for a polling message from the private mobile wireless device. If the PLMN identifier in the polling message does not correspond to the private mobile wireless network (configured as the highest priority PLMN in the EHPLMN list for the private mobile wireless device), the SRAS waits for an indication that the private mobile wireless network is in service (presumably after a failure of the private mobile wireless network causing the private mobile wireless device to attempt a connection to another mobile wireless network). After receiving confirmation of the two above-noted conditions, the SRAS issues a reset message to the private mobile wireless device triggering operation of the SIM applet for restoring a preference, by the private mobile wireless device, to connect to the private mobile wireless network.

In response to receiving the reset message issued by the SRAS, the SIM applet executes a sequence of operations causing the private mobile wireless device to re-attach to the private mobile wireless network in accordance with a selection of a PLMN identifier corresponding to the private mobile wireless network that is maintained as the highest priority entry of the EHPLMN/HPLMN listing defined in the SIM (operational) profile of the private mobile wireless device.

As such, the enhancements to the SRAS of a mobile wireless operator and a SIM applet installed on the private mobile wireless device cooperatively operate to persist the private mobile wireless network as the highest-priority (over all other available MNOs) network to which the private mobile wireless device connects on a preferred basis. By way of a particular/specific illustrative example in a 4G/5G network environment, in response to the reset triggering message invoking operation of the SIM applet, the private mobile wireless device detaches from an overlapping public MNO, clears the RPLMN and any location/public mobile wireless network information stored locally in the SIM, and forces an available mobile wireless network scan operation (looking for the highest priority PLMN in the EHPLMN/HPLMN list defined in the SIM (operational) profile of the private mobile wireless device) that results in the private mobile wireless device selecting the private mobile wireless network that is identified as the highest priority PLMN in the EHPLMN/HPLMN listing for the private mobile wireless device.

The above-summarized operation of a private mobile wireless device and an SRAS in a mobile wireless network environment in accordance with the present disclosure is further described, by way of detailed examples, herein below.

Turning to FIG. 1, an exemplary environment for carrying out the present disclosure is schematically depicted. A secondary mobile network operator (MNO) 100, operating as a roaming mobile wireless data services host, includes a secondary RAN 102 and a secondary MNO core 104 network. The secondary RAN 102 is configured to receive a Diameter Protocol connection signaling message from a private mobile wireless device 103 (including a SIM applet 105—the aforementioned preference-persisting preferred mobile network operator list reset applet) for mobile wireless data network services. The secondary MNO core 104 includes a mobility management entity (MME) 106, a DRA 107, and a source gateway (SGW) 108.

The secondary MNO 100 is configured to communicate with a primary MNO 110 (or more generally a network operator (NO) that may/may not operate an associated RAN) via an internetwork data packet exchange (IPX) of a plurality of IPX networks 111. By way of example, communication between the secondary MNO 100 and primary MNO 110 is carried out in accordance with IR.21 (GSM Association Roaming Database, Structure and Updating Procedures) under which the IMSI blocks (ranges of IMSI values) assigned to the primary MNO 110 are published to all secondary MNOs, including the secondary MNO 100.

The primary MNO 110 includes a primary MNO core 114 that includes an MME 116, a DRA 117 and a GTP Proxy 118. In accordance with the present disclosure, the primary MNO also includes a sponsored roaming application server (SRAS) 115—the functionality of which has been briefly discussed herein above.

With continued reference to FIG. 1, a private mobile wireless network 130 includes a private RAN 125 and a private mobile wireless network core 120. The private mobile wireless network core 120 includes a full set of core components such as: a DRA 121, a home subscriber server (HSS) 122, a PCRF 124, and a PGW 126. By way of example, the network core 120 operates within a home private network 130 that operates to directly host connectivity of private mobile wireless devices (e.g., the private mobile wireless device 103) via the private RAN 125.

With continued reference to FIG. 1, it is noted that simplified depictions are provided of the primary MNO 110, the secondary MNO 100, and the private mobile wireless network 130. to emphasize enhanced aspects of the primary MNO 110 relating to the DRA 116 operating as an intermediate routing node between the DRA 107 of the secondary MNO 100 and the DRA 121 of the MVNO core 120.

Turning to FIG. 2, a sequence diagram summarizes a message flow for persisting private mobile wireless network connection preference for the private mobile wireless device 103, with the private mobile wireless network 130, in accordance with the disclosure. The sequence of operations and message flows summarized in FIG. 2 are carried out in accordance with enhanced functionality incorporated into the SIM applet 105 of the private mobile wireless device 103 and the SRAS 115 that facilitates persisting, via a reset message issued by the SRAS 115 to trigger operation of the SIM applet 105, the private mobile wireless network 130 as the preferred network, identified in the RPLMN entry of the private mobile wireless device 103, to which the private mobile wireless device 103 re-connects after a service outage on the private mobile wireless network 130.

With continued reference to FIG. 2, during 201 the private mobile wireless network 130 is registered with the SRAS 115 for purposes of having the SRAS maintain (in accordance with reporting network status messaging from the private mobile wireless network 130) a current status of the private mobile wireless network 130. By way of an illustrative example, the private mobile wireless network 130 is registered with the SRAS 115 either through manual entry or messaging carried out by an automated process of the private mobile wireless network 130. Thereafter, during 202 the private mobile wireless network 130 issues a message to the SRAS 115 indicating an "in service" status for the private mobile wireless network 130. By way of example, the "in service" status is indicated via manual entry of the status at the SRAS 115 or messaging carried out by an automated process of the private mobile wireless network 130. The SRAS 115 updates the status of the private mobile wireless network 130 to be "in service" status.

During 203 the private mobile wireless device 103 performs a network scan to identify candidate mobile wireless networks within operating range of the private mobile wireless device 103 and then connect to the private mobile wireless network 130 that is indicated as the recent/preferred mobile network for mobile wireless connections by the private mobile wireless device 103.

Thereafter, during 205 the private mobile wireless device 103 reports the established connection (to the private mobile wireless network 130) to the SRAS 115. In accordance with the connection notification, the SRAS 115 registers a status of the private mobile wireless device 103 as being attached to the home network (i.e., the private mobile wireless network 130). In accordance with an aspect of the illustrative example, the private mobile wireless network 130 thereafter experiences a failure event causing the private network 130 to enter an "out of service" state.

During 206 the private mobile wireless network 130 issues a message to the SRAS 115 indicating an "out of service" status for the private mobile wireless network 130. By way of example, the "out of service" status is indicated via manual entry of the status at the SRAS 115 or messaging carried out by an automated process of the private mobile wireless network 130. The SRAS 115 updates the status of the private mobile wireless network 130 to be "out of service" status.

In accordance with another aspect of the illustrative example, during 207 the private mobile wireless device 103 performs a supplemental wireless network scan to identify candidate mobile wireless networks within operating range of the private mobile wireless device 103 and then connect to the secondary MNO 100 that is indicated as an acceptable replacement for the (failed) private mobile wireless network 130. Thereafter, during 208 the private mobile wireless device 103 reports the established connection (to the secondary MNO 100) to the SRAS 115. By way of example, after establishing connectivity, the SIM applet 105 executed by the private mobile wireless device 103 issues a message to the SRAS 115 that identifies an attached visited PLMN. In accordance with the connection notification, the SRAS 115 registers a status of the private mobile wireless device 103 as being attached to a non-home network (i.e., not attached to the "home" private mobile wireless network 130).

Thereafter, the private mobile wireless network 130 transitions back to an "in service" state and issues, during 209, an "in service" event message to the SRAS 115. By way of example, the "in service" status is indicated via manual entry of the status at the SRAS 115 or messaging carried out by an automated process of the private mobile wireless network 130. The SRAS 115 receiving the indication from the private mobile wireless device 103 (connected to the non-preferred mobile wireless network) that the private mobile wireless network 130 is back "in service", causes the SRAS 115 to invoke a restorative procedure in the SRAS 115. The restorative procedure operates in the SRAS 115 resulting the SRAS 115 issuing, during 210, a trigger message to the SIM applet 105 to restore the private mobile wireless network 130 as the preferred mobile wireless network for the private mobile wireless device 103 via a reset SIM profile operation.

Figure 2A:
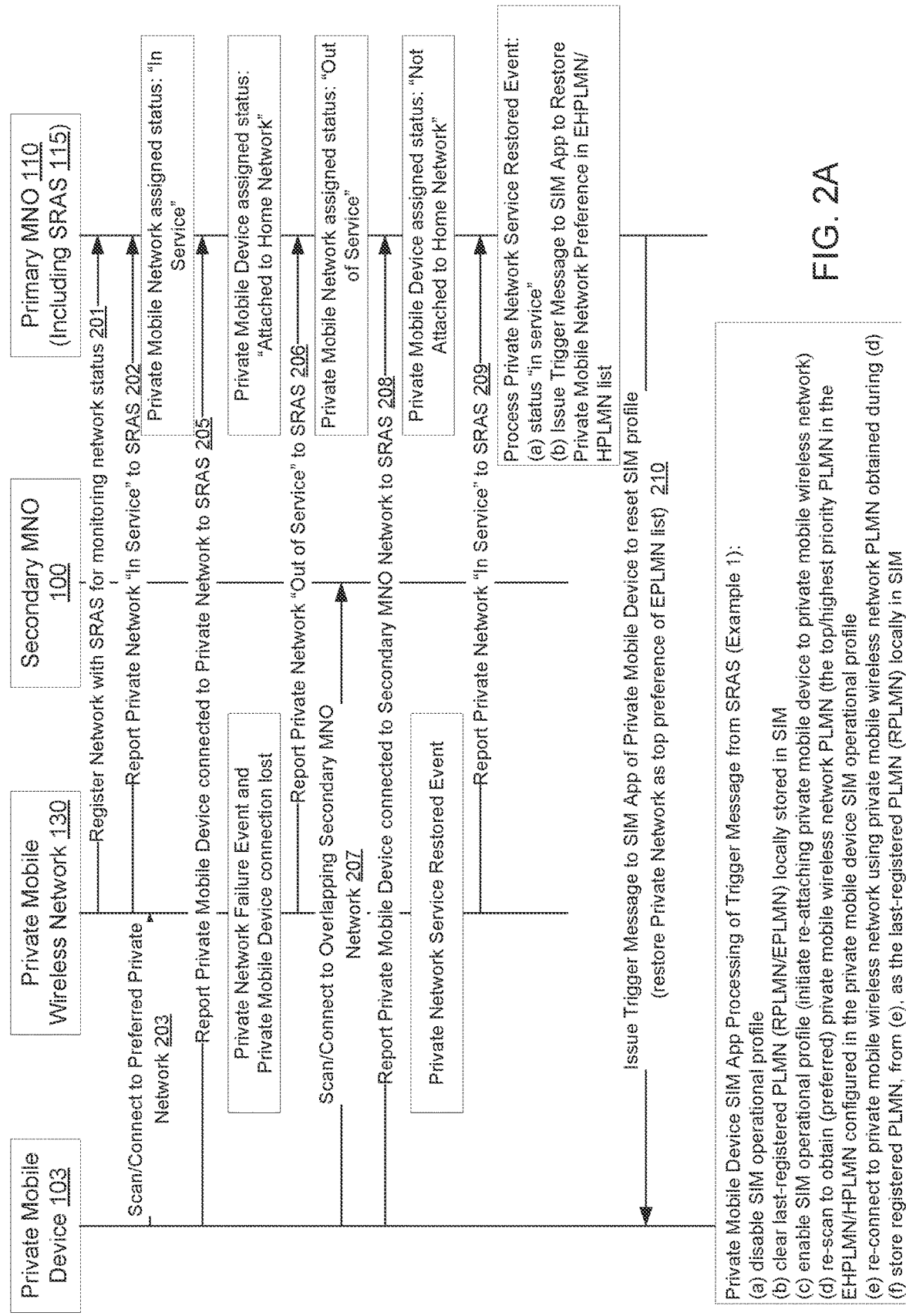
FIG. 2A is a sequence diagram summarizing messaging flow for executing connection signaling messaging in a case where a private mobile wireless network becomes unavailable to a private mobile wireless device in accordance with a first illustrative example of the disclosure.

With continued reference to FIG. 2A, upon receiving the trigger message from the SRAS 115, the private mobile wireless device 103, during 212, performs a series of operations to restore the persisted connectivity preference by the private mobile wireless device 103 for connecting to the private mobile wireless network 130. Thus, the trigger message, received by the private mobile wireless device, invokes the SIM Applet 105 to execute a set of restorative operations to ensure that the preferred status of the private mobile wireless network 130 persists, in the event of the private mobile wireless network 130 going into an "out of service" state, upon re-establishing an "in service" status for the private mobile wireless network 130.

By way of a first illustrative example, summarized in a set of operations a-f in FIG. 2A, such restoration of the "preferred" status of the private mobile wireless network 130 is carried out by performing the following series of operations to restore a persisted connectivity preference, by the private mobile wireless network device 130, for connecting to the private mobile wireless network 130 (after service is restored to the network 130 following a service outage of the private mobile wireless network 130):

(a) disabling the SIM operational profile;
    (b) clearing the last-registered PLMN (RPLMN/EPLMN) entry stored locally in the SIM;
    (c) enabling the SIM operational profile (to initiate re-attaching private mobile wireless device to the private mobile wireless network—the highest ranked network identified in the EHPLMN listing);
    (d) re-scanning, using a prioritized PLMN identifier listing (having the private mobile wireless network 130 PLMN identifier as the highest priority entry), available wireless networks to obtain the private mobile wireless network 130 PLMN identifier as a highest priority PLMN available for attempting a connection PLMN broadcasted by private mobile wireless network;

(e) re-connecting, using the private mobile wireless network 130 PLMN identifier obtained during (d), to the private mobile wireless network 130; and (f) storing the private mobile wireless network 130 PLMN identifier as the last-registered PLMN (RPLMN) for the private mobile wireless device 103 SIM.

Figure 2B:
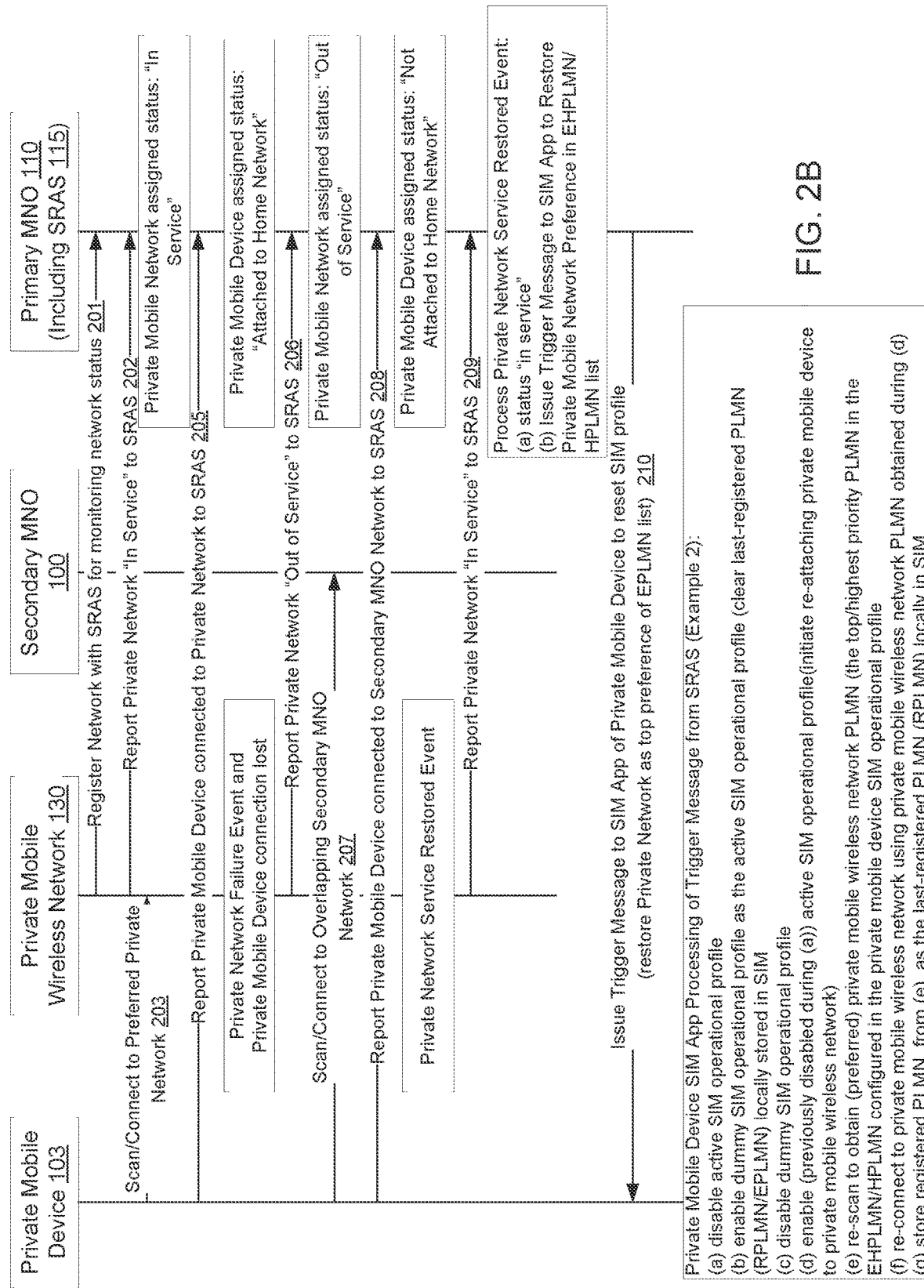
FIG. 2B is a sequence diagram summarizing messaging flow for executing connection signaling messaging in a case where a private mobile wireless network becomes unavailable to a private mobile wireless device in accordance with a second illustrative example of the disclosure.

By way of a second illustrative example, summarized in a series of operations a-g in FIG. 2B), restoration of the "preferred" status of the private mobile wireless network 130 (by re-storing the corresponding PLMN identifier as the RPLMN for the device 103) is carried out by performing the following series of operations that use a "dummy" SIM operation profile, which does not have any valid MNO operator information (e.g., PLMN identifiers). Upon receiving a triggering message from SRAS 115, the SIM applet 105 executes the following series of operations to restore a persisted connectivity preference, by the private mobile wireless network device 130, for connecting to the private mobile wireless network 130 (after service is restored to the network 130 following a service outage of the private mobile wireless network 130):

(a) disabling an active SIM operational profile of the private mobile wireless device 103;

(b) enabling a dummy SIM operational profile as the active SIM operational profile on the private mobile wireless device 103 (resulting in clearing the last RPLMN/EPLMN stored locally in the SIM of the private mobile wireless device 103);

(c) disabling the dummy SIM operational profile;

(d) enabling the (previously disabled) private mobile wireless network associated SIM operational profile (to initiate re-attaching private mobile wireless device to the private mobile wireless network—the highest ranked network identified in the EHPLMN listing);

(e) re-scanning, using a prioritized PLMN identifier listing (having the private mobile wireless network 130 PLMN identifier as the highest priority entry), available wireless networks to obtain the private mobile wireless network 130 PLMN identifier as a highest priority PLMN available for attempting a connection PLMN broadcasted by private mobile wireless network;

(f) re-connecting, using the private mobile wireless network 130 PLMN identifier obtained during (d), to the private mobile wireless network 130; and (g) storing the private mobile wireless network 130 PLMN identifier as the last-registered PLMN (RPLMN) for the private mobile wireless device 103 SIM.

The following are two, of potentially many, series of operations carried out by the SIM applet 105 to restore the (preferred) private mobile wireless network 130 PLMN identifier in the RPLMN entry used by the private mobile wireless device 103 to establish a persisted mobile wireless network connection to the private mobile wireless network 130 in accordance with the present disclosure.

All references, including publications, patent applications, and patents, cited herein are hereby incorporated by reference to the same extent as if each reference was individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method, carried out by a private mobile wireless terminal comprising a subscriber identification module applet, for persisting a connectivity preference for a home mobile wireless network that is a private mobile wireless network, wherein the private mobile wireless terminal operates in a mobile wireless environment comprising a primarily mobile network provider including a sponsored roaming application server (SRAS), and wherein the method comprises:

performing a network scan to identify candidate mobile wireless networks within operating range of the private mobile network device and then connecting to the private mobile wireless network that is indicated as the recent/preferred mobile network for mobile wireless connections;

reporting the established connection, to the private mobile wireless network, to the SRAS;

losing the established connection as a result of the private mobile wireless network being in an out of service state;

performing a supplemental wireless network scan to identify candidate mobile wireless networks within operating range of the private mobile network device and then establishing a new connection to an alternative secondary mobile wireless network that is indicated as an acceptable replacement for the private mobile wireless network;

receiving a trigger message issued by the SRAS that invokes the SIM applet to perform a series of operations to restore a persisted connectivity preference for connecting to the private mobile wireless network after service is restored following a service outage of the private mobile wireless network.

2. The method of claim 1, wherein the series of operations comprises:

disabling a SIM profile of the private mobile wireless device;
clearing a last-registered entry on the SIM profile;
enabling the SIM profile;
obtaining, by invoking a re-scan of available wireless networks, the private mobile wireless network PLMN identifier as a highest priority PLMN for establishing a mobile wireless connection; and
re-connecting to the private mobile wireless network based on the obtained private mobile wireless network PLMN.

3. The method of claim 2, wherein the series of operations further comprises, after the re-connecting, the further operation of:
storing the private mobile wireless network PLMN as the Registered PLMN entry on the SIM of the private mobile device.

4. The method of claim 2, wherein the last-registered entry on the SIM profile comprises a registered public land mobile network (RPLMN) entry.

5. The method of claim 2, wherein the last-registered entry on the SIM profile comprises an equivalent public land mobile network (EPLMN) entry.

6. The method of claim 1, wherein the series of operations comprises:
disabling an active SIM operational profile of the private mobile wireless device;
enabling a dummy SIM operational SIM profile resulting in clearing a last-registered entry on the SIM profile;
disabling the dummy SIM operational profile;
enabling the active SIM operational profile;
obtaining, by invoking a re-scan of available wireless networks, the private mobile wireless network PLMN identifier as a highest priority PLMN for establishing a mobile wireless connection; and
re-connecting to the private mobile wireless network based on the obtained private mobile wireless network PLMN.

7. The method of claim 6 wherein the series of operations further comprises, after the re-connecting, the further operation of:
storing the private mobile wireless network PLMN as the Registered PLMN entry on the SIM of the private mobile device.

8. The method of claim 6, wherein the last-registered entry on the SIM profile comprises a registered public land mobile network (RPLMN) entry.

9. The method of claim 6, wherein the last-registered entry on the SIM profile comprises an equivalent public land mobile network (EPLMN) entry.

10. A private mobile wireless network device comprising:
a processor; and
a non-transitory computer-readable medium including computer-executable instructions that, when executed by the processor, facilitate carrying out a method, carried out by the private mobile wireless terminal comprising a subscriber identification module applet, for persisting a connectivity preference for a home mobile wireless network that is a private mobile wireless network, wherein the private mobile wireless terminal operates in a mobile wireless environment comprising a primarily mobile network provider including a sponsored roaming application server (SRAS), and wherein the method comprises:
performing a network scan to identify candidate mobile wireless networks within operating range of the private mobile network device and then connecting to the private mobile wireless network that is indicated as the recent/preferred mobile network for mobile wireless connections;
reporting the established connection, to the private mobile wireless network, to the SRAS;
losing the established connection as a result of the private mobile wireless network being in an out of service state;
performing a supplemental wireless network scan to identify candidate mobile wireless networks within operating range of the private mobile network device and then establishing a new connection to an alternative secondary mobile wireless network that is indicated as an acceptable replacement for the private mobile wireless network;
receiving a trigger message issued by the SRAS that invokes the SIM applet to perform a series of operations to restore a persisted connectivity preference for connecting to the private mobile wireless network after service is restored following a service outage of the private mobile wireless network.

11. The private mobile wireless network device of claim 10, wherein the series of operations comprises:
disabling a SIM profile of the private mobile wireless device;
clearing a last-registered (RPLMN/EPLMN) entry on the SIM profile;
enabling the SIM profile;
obtaining, by invoking a re-scan of available wireless networks, the private mobile wireless network PLMN identifier as a highest priority PLMN for establishing a mobile wireless connection; and
re-connecting to the private mobile wireless network based on the obtained private mobile wireless network PLMN.

12. The private mobile wireless network device of claim 11, wherein the series of operations further comprises, after the re-connecting, the further operation of:
storing the private mobile wireless network PLMN as the Registered PLMN entry on the SIM of the private mobile device.

13. The private mobile wireless network device of claim 11, wherein the last-registered entry on the SIM profile comprises a registered public land mobile network (RPLMN) entry.

14. The private mobile wireless network device of claim 11, wherein the last-registered entry on the SIM profile comprises an equivalent public land mobile network (EPLMN) entry.

15. The private mobile wireless network device of claim 11, wherein the series of operations comprises:
disabling an active SIM operational profile of the private mobile wireless device;
enabling a dummy SIM operational SIM profile resulting in clearing a last-registered (RPLMN) entry on the SIM profile;
disabling the dummy SIM operational profile;
enabling the active SIM operational profile;
obtaining, by invoking a re-scan of available wireless networks, the private mobile wireless network PLMN identifier as a highest priority PLMN for establishing a mobile wireless connection; and
re-connecting to the private mobile wireless network based on the obtained private mobile wireless network PLMN.

16. The private mobile wireless network device of claim 15, wherein the series of operations further comprises, after the re-connecting, the further operation of:

storing the private mobile wireless network PLMN as the Registered PLMN entry on the SIM of the private mobile device.

17. The private mobile wireless network device of claim 15, wherein the last-registered entry on the SIM profile comprises a registered public land mobile network (RPLMN) entry.

18. The private mobile wireless network device of claim 15, wherein the last-registered entry on the SIM profile comprises an equivalent public land mobile network (EPLMN) entry.

\* \* \* \* \*